(12) United States Patent
Brooks et al.

(10) Patent No.: US 11,887,161 B2
(45) Date of Patent: Jan. 30, 2024

(54) SYSTEMS AND METHODS FOR DELIVERING CONTENT TO MOBILE DEVICES

(71) Applicant: 3M INNOVATIVE PROPERTIES COMPANY, St. Paul, MN (US)

(72) Inventors: Brian E. Brooks, St. Paul, MN (US); Frederick J. Arsenault, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/736,344

(22) Filed: May 4, 2022

(65) Prior Publication Data

US 2022/0261850 A1 Aug. 18, 2022

Related U.S. Application Data

(63) Continuation of application No. 14/891,860, filed as application No. PCT/US2014/040455 on Jun. 2, 2014, now Pat. No. 11,354,704.

(60) Provisional application No. 61/917,622, filed on Dec. 18, 2013, provisional application No. 61/834,465, filed on Jun. 13, 2013.

(51) Int. Cl.
*G06Q 30/00* (2023.01)
*G06Q 30/0251* (2023.01)
*H04W 4/029* (2018.01)
*G06Q 30/02* (2023.01)
*G06Q 30/0241* (2023.01)

(52) U.S. Cl.
CPC ......... *G06Q 30/0261* (2013.01); *G06Q 30/02* (2013.01); *G06Q 30/0241* (2013.01); *G06Q 30/0267* (2013.01); *H04W 4/029* (2018.02)

(58) Field of Classification Search
CPC .............................. H04W 4/029; G06Q 30/02
See application file for complete search history.

(56) References Cited

U.S. PATENT DOCUMENTS

| 9,098,839 | B2 * | 8/2015 | Miyaki ............ H04N 21/41422 |
|---|---|---|---|
| 2003/0006913 | A1 | 1/2003 | Joyce |
| 2008/0139181 | A1 | 6/2008 | Lokshin |
| 2009/0012847 | A1 | 1/2009 | Brooks |
| 2009/0012848 | A1 | 1/2009 | Brooks |
| 2009/0012927 | A1 | 1/2009 | Brooks |
| 2009/0030780 | A1 | 1/2009 | York |
| 2009/0163187 | A1 | 6/2009 | Terrell, II |
| 2009/0204573 | A1 | 8/2009 | Neuneier |
| 2010/0017288 | A1 | 1/2010 | Graham, II |
| 2010/0280874 | A1 | 11/2010 | Thorn |
| 2011/0055132 | A1 | 3/2011 | Mahdian |
| 2012/0158455 | A1 | 6/2012 | Pathak |

(Continued)

OTHER PUBLICATIONS

International Search Report for PCT International Application No. PCT/US2014/040455, dated Oct. 16, 2014, 3pgs.

*Primary Examiner* — Alvin L Brown
(74) *Attorney, Agent, or Firm* — Bryan Walker

(57) ABSTRACT

At least some aspects of the present disclosure feature systems and methods for delivering content to a mobile device. In one embodiment, the system receives location information of the mobile device and determines a response duration. The system selects a content piece to deliver to the mobile device based on information regarding content comparisons or experimental units.

20 Claims, 6 Drawing Sheets

(56) References Cited

U.S. PATENT DOCUMENTS

2013/0024270 A1 1/2013 Linzie
2013/0290095 A1* 10/2013 Crinon .............. G06Q 30/0246
　　　　　　　　　　　　　　　　　　　　705/14.45

* cited by examiner

SYSTEMS AND METHODS FOR DELIVERING CONTENT TO MOBILE DEVICES

TECHNICAL FIELD

The present disclosure relates to distribution of digital communication content to personal mobile devices and/or to on-site displays, in a matter such that the distribution patterns enable measurement of the impact of digital communication content on audience behavior.

SUMMARY

At least some aspects of the present disclosure feature a method of determining how effective content is in influencing recipient behavior with a computer system having one or more processors and memories. The method includes the steps of: receiving a plurality of content pieces, wherein each content piece is associated with at least one content comparison; receiving location information that defines the location of a mobile device within a response area, the mobile device associated with a content recipient; based on the location information, computing a response duration that defines a period of time during which content recipient likely act in response to exposure to a content piece; receiving content exposure data that specifies previous content pieces already presented in the response area within the response duration and previous content comparisons that the previous content pieces are associated with; selecting, by one of the one or more processors, a mobile content piece for exposure to the content recipient from the plurality of content pieces, and wherein the selected mobile content piece is not associated with any of the previous content comparisons or identical to one of the previous content pieces; and providing the mobile content piece to the mobile device.

At least some aspects of the present disclosure feature a computer system for determining how effective content is in influencing recipient behavior. The system includes: a data repository storing a plurality of content pieces, wherein each content piece is associated with at least one content comparison; a location parsing unit configured to receive location information that defines the location of a mobile device within a response area, the mobile device associated with a content recipient; a content managing unit configured to select a mobile content piece from the plurality of content pieces; and a content serving unit configured to provide the selected mobile content piece to the mobile device. The content managing unit is further configured to based on the location information, compute a response duration that defines a period of time during which content recipient likely act in response to exposure to a content piece in the response area. The content managing unit is further configured to retrieve content exposure data that specifies previous content pieces already presented in the response area within the response duration and previous content comparisons that the previous content pieces are associated with. The selected mobile content piece is not associated with any of the previous content comparisons or identical to one of the previous content pieces.

BRIEF DESCRIPTION OF THE DRAWINGS

The accompanying drawings are incorporated in and constitute a part of this specification and, together with the description, explain the advantages and principles of the disclosure. In the drawings.

DETAILED DESCRIPTION

Figure 1:
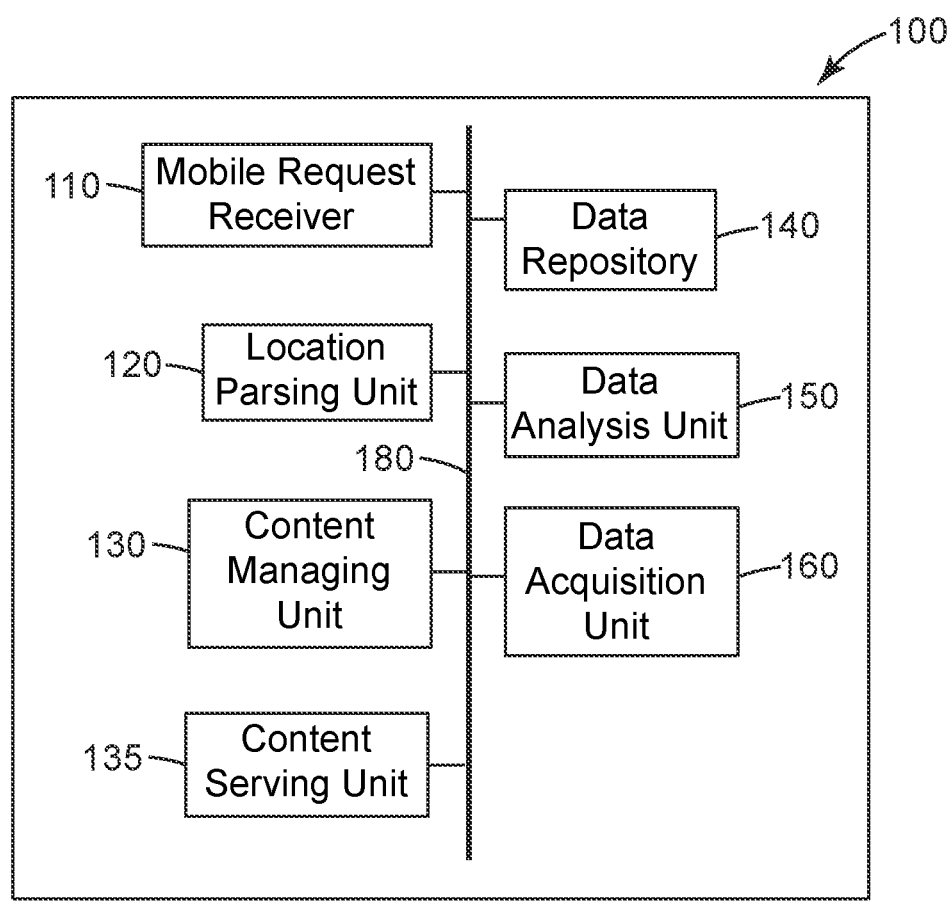
FIG. 1 illustrates a block diagram of an embodiment of a mobile content distribution system.

Internet commerce grew massively and continues to grow, in part because it is a medium for marketing and communication that is susceptible to experimentation, with a well-defined feedback loop established by the act of clicking on a piece of content to follow the link. The simplicity of that relationship between the content and the response, along with means of defining who is acting that enable the testing and optimization of content through means such as Google Analytics, and enabled business models such as pay-per-click due to the naturally closed loop of internet behavior.

The off-line economy strongly demands analogous capabilities to test and optimize content. However, the off-line economy does not allow for the kinds of unconfounded content presentation that websites do, and lack the closed feedback loop of the internet, since the content and the desired behavior lack the closed loop made possible by the internet, and where more confounds can muddy the relationship between the content and behavior.

The closed loop does not exist because the relationship between off-line communications content and off-line behaviors is far more difficult to track and far more complex. Instead of being served content in response to a discrete request for a website, and interacting directly with the content through a click, content comes through multiple channels and is often displayed regularly or continuously without user input, and the desired behavior is usually undertaken through means that do not require interaction with the content, such as purchasing a particular item, or moving to a particular region within a location.

One aspect of the off-line economy where measurement and optimization capabilities are strongly desired is the delivery of content to mobile devices in store environments. Despite the use of the internet to fulfill requests for content from mobile devices, there is still the disconnect between requesting and receiving mobile content and the action, since the desired behavior to be tracked is an in-store purchase instead of an online click. This lack of a closed loop makes it very difficult to measure important activities that are done in response to the mobile content, creating a great need for a means of closing the feedback loop from delivered mobile content to measurable result.

Current efforts to capture the impact of advertising on in-store behavior are centered either on token creation or data mining. Token creation involves introducing some additional behavior to link the promotion to an individual's purchase through methods such as Microsoft TAG, couponing programs such as Groupon, loyalty rewards programs and check-ins such as social media platforms. These approaches have limitations, for example, token approaches end up with small and biased samples as a result of the need to opt-in or take additional steps to use the token, and typically suffer from increased cost and complexity due to a need to induce users to participate in the token system. Data mining approach requires a significant volume of data, and is limited to correlational studies, not cause-and-effect experimentation.

At least some aspects of the present disclosure are directed to systems and methods for managing delivery of content to mobile devices and allowing the content served to be associated with changes to content recipient behavior. Content is usually designed to influence a viewer's decision making, also referred to as content objective, which is often reflected in content recipient behavior. For example, an advertisement with a picture of a chocolate sundae is designed to encourage customers to buy a chocolate sundae. In some cases, the system manages delivery of content to mobile devices and/or stationary displays at a location to evaluate effectiveness of content on influencing behavior. In some embodiments, the method includes the steps of: receiving a request from a mobile device, identifying the location from which the request was made, checking for an ongoing content evaluation in that location, selecting an experimental unit if one exists or creating an experimental unit for the location if one does not currently exist, and selecting content to serve in response to the mobile request based on the experimental design. Optionally, the method may also include the steps of collecting data regarding a desired behavior at the location, and associating that behavior data with the content served during the experimental unit, where the duration of the experiment unit is based on viewer visit duration (VVD) and/or a recipient response duration (RRD) (i.e., the time period during which a typical recipient of content is likely to act in response to the content at a location), or referred to as a response duration.

Experimental units refer to a period of time, which can have a predetermined duration or a duration defined by reaching a predefined level of activity, during which one or more selected pieces of content are delivered to mobile devices and displays within a location and data indicative activities at the location is collected, where the content is associated with a content objective (e.g., to improve knowledge, to increase product sales). The experimental units are generated based on the time during which an actor could perform the measured behavior at the location after his or her potential exposure to the content. When an experimental unit associated with the same content objective is ongoing, requests for content are assigned to the ongoing experimental unit; if there is no ongoing experimental unit, a new one is created, identifying the location of the request at a particular time. The experimental unit then provides a time period during which content may be displayed, and during which data indicative of activities at the location may be collected. The duration of the experimental unit is based on recipient response duration.

In some cases, content is assigned to experimental units to evaluate the effectiveness of content. In some embodiments, content effectiveness is evaluated by implementing an experiment. Implementing the experiment may include serving content relevant to the request and the location, properly randomizing, blocking, balancing and counterbalancing the experiment when selecting the content, preventing confounding of the experimental unit by excluding non-identical related content from being subsequently assigned to a unit once a piece of content has been selected for it. Two pieces of content are related if both of them have impacts on a same content objective. For example, a first piece of content having a first image of a chicken sandwich is related to a second piece of content having a second image of a chicken sandwich as both pieces of content designed to increase sales of chicken sandwich.

In some embodiments, the selection of content for the experiment is randomized without regard to the content presented on displays in the identified location. In other embodiments, the content is selected with regard to the content presented on displays and/or in other formats (e.g., posters, end-cap displays, etc.) in the identified location. In such embodiments, both content delivered to mobile devices and content schedule on displays at the location are selected using a content evaluation scheme, for example, an approaching using experiment.

Response area refers to an area that a content recipient with a mobile device is likely travel within the response duration such that the recipient's activities can be observed. For example, a response area is an area within five (5) miles surrounding a restaurant A. Since content effects may occur beyond the intended purpose of the content, it may be necessary to test pieces of content against pieces of content having different intended purposes, to evaluate their effects against one another, including all of the trade-offs and unexpected effects. In such content comparisons, the pieces of content may confound one another. A content comparison may include pieces of content that are determined by a user selection of the pieces of content to be compared, or determined automatically by an algorithm using content effectiveness data to make decisions regarding what content pieces to compare.

In some embodiments, by using data identifying pieced of content for a content comparison, it is possible to avoid confounds even when testing content pieces with different purposes against one another. For example, a content distribution system may identify a common content comparison that two pieces of content are a part of and preventing both pieces of content from being delivered to mobile devices within a given response area during a response duration. As an example, content pieces for a content comparison include the pool of content pieces that are treated as experimental content in an experiment. For example, a comparison between content intended to sell salads and content intended to sell grilled chicken sandwiches may be tested against one another by a quick serve restaurant to measure the impact of each piece of content on overall gross profit, even though the sandwiches and salads are different product categories. In some cases, if a mobile device is in the response area, a mobile content piece can be selected and provided to the mobile device. The selected mobile content is typically selected from a pool of content pieces, where each content piece is associated with one or more content comparisons. In some embodiments, the content distribution system retrieves the content exposure data includes the previous content pieces distributed in the response area within the response duration. The selected mobile content piece is not associated with any content comparisons that are associated with the previous content pieces or identical to one of the previous content pieces.

FIG. 1 illustrates a block diagram of an embodiment of a mobile content distribution system 100. The system 100 includes a mobile request receiver 110, a location parsing unit 120, a content managing unit 130, a data repository 140, a data analysis unit 150, a data acquisition unit 160, and a communication interface 180. The mobile request receiver 110 can receive requests for content from mobile devices (e.g., cellular phones, tablet computers, iPad, etc.). The request may be a request for a particular web page, an entry into a search engine, or other similar actions that request content. The location parsing unit 120 can parse location information from the requests received. In some embodiments, location information can be part of the mobile requests. Location information can be obtained from a mobile device in a number of ways including, for example, near-field communications (e.g., Bluetooth), pings sent out to detect wireless networks, GPS data, cell phone tower triangulation, or the like. In some cases, instead of providing mobile content by request, the system 100 can "push" content pieces to mobile devices. The content managing unit 130 can assess the content requests and related location information, and select and/or create pieces of content in response to the content requests.

Location information may be used to identify the location of the mobile device and assess whether or not the request for content should be part of an experiment by verifying that the request is being made from an environment where immediate action in response to the content is possible and measurable. The location information may also be used to prevent confounding to other ongoing content evaluation within the same location, for example, presenting related content to displays intended to influence the same measurable behavior. A location may refer to a specific place, for example, a retail store, a quick-serve restaurant, a car dealership, a reception area of a building, a floor of a hotel; and/or an area close to the specific place such that a mobile device user can travel to these locations within the duration of an experiment unit or a response duration, for example.

In some embodiments, the data repository 140 stores a plurality of content pieces, wherein each content piece is associated with at least one content comparison. The location parsing unit 120 is configured to receive location information that defines the location of a mobile device within a response area, the mobile device associated with a content recipient. The content managing unit 130 is configured to based on the location information, compute a response duration that defines a period of time during which content recipient likely act in response to exposure to a content piece in the response area. The content managing unit 130 is further configured to retrieve content exposure data that specifies previous content pieces already presented in the response area within the response duration and previous content comparisons that the previous content pieces are associated with. The content managing unit 130 is further configured to select a mobile content piece from the plurality of content pieces such that the selected mobile content piece is not associated with any of the previous content comparisons or identical to one of the previous content pieces. The content serving unit 135 is configured to provide the selected mobile content piece to the mobile device.

The mobile content distribution system 100 can deliver content to both mobile devices and displays at the location. A system including electronically addressable displays dispersed in multiple locations is often referred to as a digital signage system. A challenge specific to the mobile content distribution system 100, which is not experienced in digital signage systems, is the intermittent nature of opportunities to present content. On a digital signage network, the signs are constantly active during the location's business hours. For mobile content, the system does not have an opportunity to present a specific instance of content until it has been requested, such as through accessing a web page. This means that parsing of a display schedule into time-slot samples, and creating playlists by assigning content to those time-slot samples may frequently miss data points, because the mobile requests may come outside of a strict schedule and may frequently fall into clear-out periods where the data must be discarded due to the risk of confounds. Instead, the content managing unit 130 creates experimental units or uses on-going experiment units and assigns identified content to the experimental units in response to the receipt of mobile requests to ensure that as much data as possible is captured in a way where it can be known to be confound-free.

The data acquisition unit 160 acquires data indicative of activities at the location. Activities of interest, for example, may be a purchase, a person's movement such as moving direction and moving speed, a person's position, or an action such as picking up an item. In some cases, the data acquisition unit 160 may include one or more sensors to detect persons' movements, positions, and actions, or a point of sale system (POS). Content can be assigned to stationary displays (i.e., displays placed within the location, such as digital signage) with specific knowledge of their locations and with specific objectives. For mobile devices, however, that information needs to be extracted at the time of the request, since many possible requests could occur outside of environments where the content can be acted upon.

The location data can, in some embodiments, be used to provide additional measurement capabilities, enabling the measurement of interactions between content on stationary displays and content delivered to mobile devices at the same location. In such embodiments, the location data is additionally used to identify displays and within-location content that are presented on the displays at the location, such that the effectiveness of a combination of mobile content and within-location content can be evaluated. Additionally, the combination of mobile content and within-location content may be randomized as part of the content evaluation. In some cases, the within-location content can be controlled by the content managing unit 130 to ensure the randomization. In some other cases, the within-location content is not controlled by the content managing unit 130 but can be identified by the content managing unit 130 to ensure the randomization of the combination of mobile content and within-location content.

In some embodiments, the system can include a data analysis unit 150 to evaluate the effectiveness of content. In embodiments where the experimental unit is defined as a period of time, effectiveness of content may be evaluated based on the activity at the location during that period of time. For example, content A and content B both influence viewers' decision on buying chicken sandwiches. If within an experimental unit, the system collects data indicating 60 chicken sandwich at the location delivering content A to mobile devices and/or displays and collects data indicating 40 chicken sandwich at the location delivering content A to mobile devices and/or displays, content A is likely more effective than content B. In embodiments where the experimental unit is defined by a predetermined level of activity at the location, the time required to observe that level of activity can be used as the basis for the evaluation of effectiveness of content. For example, content A and content B both influence viewers' decision on buying chicken sandwiches. A predetermined level of transactions is defined as selling 50 chicken sandwiches. If the length of time for the predetermined level of transactions to occur when content A is displaying is 120 minutes and the length of time for the predetermined level of transactions to occur when content B is displaying is 140 minutes, content A is likely more effective than content B.

The data analysis unit 150 receives information regarding pieces of content and the data indicative of activities at a location where pieces of content is displayed, the data analysis unit 150 will have the necessary information to choose the appropriate statistical test to apply to the collected data. For example, a t-test or a Chi-Squared test may be used for the inferential statistical test. In some embodiments, the collected data indicative of activities at a content display location is weighted when the data is analyzed for content effectiveness evaluation. In one embodiment, the weighting can be based on the time at which a data point occurs relative to the display of potentially confounding content. In some cases, the weighting can use a function of the carryover confound duration. The carryover confound duration is based on information describing the likelihood that the data point could have been influenced by a piece of content displayed previously.

The mobile content distribution system may apply experimental design principles to determine effectiveness of a piece of content. Various aspects of experimental design are disclosed in details in commonly assigned U.S. Patent Application Publication No. 2010/0017288, entitled "Systems and Methods for Designing Experiments," U.S. Patent Application Publication No. 2009/0012848, entitled "System and Method for Generating Time-slot Samples to Which Content May be Assigned for Measuring Effects of the Assigned Content," U.S. Patent Application Publication No. 2009/0012927, entitled "System and Method for Assigning Pieces of Content to Time-slots Samples for Measuring Effects of the Assigned Content," U.S. Patent Application Publication No. 2009/0012847, entitled "System and Method for Assessing Effectiveness of Communication Content," and U.S. Patent Application Publication No. 2013/0024270, entitled "Systems and Methods for Transactions-based Content Management on a Digital Signage Network," which are incorporated herein by reference in entirety.

The data repository 140 fulfills the data storage needs for the mobile content distribution system 100. The data repository 140 may store data acquired by the data acquisition unit 160 at one or more locations. The data repository 140 may store content related information, such as rules applying cognitive science to a store location, content templates, pieces of content, and other information. The data repository 140 may be any non-transitory computer readable medium. For example, it may include random access memory, a flat file, a XML file, or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository 140, for example, may be a single relational database such as SQL Server from Microsoft Corporation. In some cases, the data repository 140 may include a plurality of databases that can exchange and aggregate data by data integration process or software application. In an exemplary embodiment, part of the data repository 140 may be hosted in a cloud data center.

The communication interface 180 can provide electronic communication among the components of the mobile content distribution system 100. The communication interface 180 can include both short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface 180 may be either within a private computer network, such as intranet, or on a public computer network, such as the internet.

Various components of the mobile content distribution system 100 can be implemented by one or more computing devices, including but not limited to, circuits, a computer, a processor, a processing unit, a microprocessor, and/or a tablet computer. In some cases, various components of the mobile content distribution system 100 can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the system 100 can be implemented in software or firmware executed by a computing device.

Figure 2A:
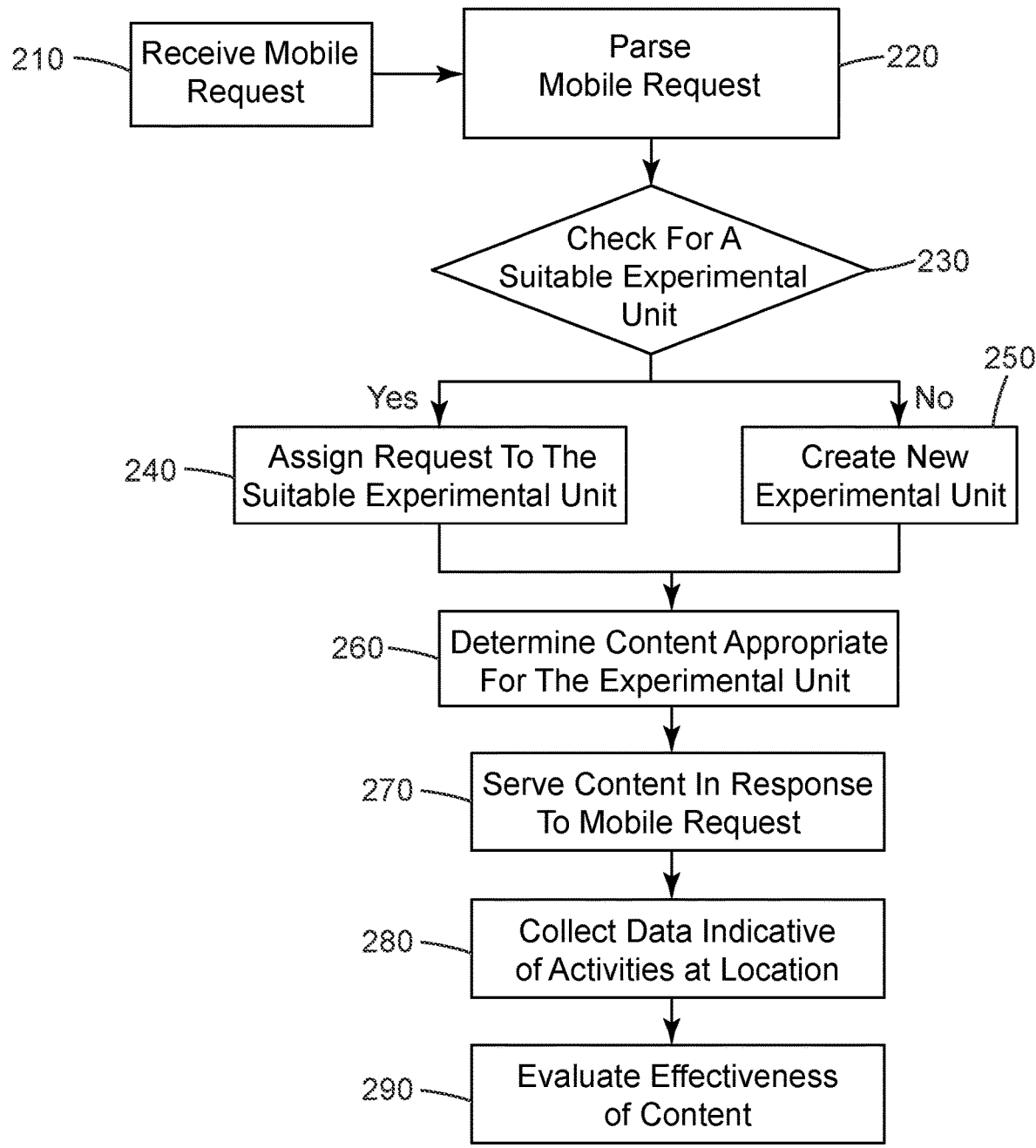
FIGS. 2A and 2B illustrate flow diagrams for some embodiments of a mobile content distribution system.

FIG. 2A illustrates a flow diagram for one embodiment of a mobile content distribution system. First, a request for mobile content is received (step 210). This request can be parsed to retrieve relevant information, for example, the content objective (i.e., the objective of the content designed to influence content recipient behavior) and the location information (step 220). The content objective is determined through means such as, for example, the specific page being requested or the search terms being used. The location the request was made may be determined from various sources of location data, such as the device's pings seeking out networks within the location, GPS data, cell tower data and triangulation, the IP address of the network from which the request is originating, etc. The location information and content objective can be used to determine if the mobile request may be used in an ongoing content effectiveness evaluation session.

If the request can be used in an on-going evaluation session, the system then checks for whether an experimental unit related to the same content objective currently exists (step 230). If an experimental unit currently exists, then the request is assigned to the experimental unit (step 240). If there is no current experimental unit in the location related to the content objective, then a new experimental unit is created (step 250). This experimental unit can be a time period during which content is delivered and data indicative of activities at the location is collected. The duration of the experimental unit can be related to the response latency of a mobile user and/or a typical duration of a visitor may spend at a location. Appropriate content is then determined for the experimental unit (step 260), whether the experimental unit was preexisting, or if it was newly created. For preexisting experimental units, the content is selected to continue the same treatment and/or to not confound the treatment applied earlier in the experimental unit. In some embodiments of using experimental design, design techniques including but not limited to blocking, balancing, counterbalancing, prevention of confounds, randomization, and a combination thereof are used to select the piece of content. In some cases, the randomization may be based solely on the pool of mobile content, or the selection of content to create a combination of the mobile content and the content already on display at a location. The selected content is then served to the mobile device, in response to the initial request (step 270).

In some embodiments, ongoing content effectiveness evaluation session may be selected depending on the particular location of the request. In some cases, more than one evaluation sessions may fit to the request. Optionally, the evaluation sessions may be given a value or priority to assist the allocation of potential experimental units to particular evaluation sessions, especially when there may be multiple evaluation sessions that a given mobile request could fit into, or when certain experiments may be separate because of risk of creating confounds for one another. The evaluation session may has information defining the duration of the experiment units for the session, for example, the duration between a request and the opportunity for receivers to act on the mobile content (RRD), the viewer visit duration (VVD), or a predetermined level of activity needed to end the experimental unit. In some embodiments, the evaluation session may be selected by referencing the value or priority of the possible experimental units and/or the duration needed for an experimental unit, and/or the risk of confounding other experimental units. In some cases, this may be done through optimization algorithms or machine learning routines.

When there is not an existing evaluation session, a new experimental unit is created. The experimental unit may be defined by a particular period of time during which action in response to the content could be expected. Alternatively, the experimental unit may be triggered to start by a mobile request and to end by a predetermined level of activity (i.e., a predetermined number of transactions). Content is assigned to respond to the request as a part of the experimental unit. Where the experimental unit existed prior to the request, the response to the request may be the content that was previously selected for other mobile requests and/or for within-location displays for the experimental unit, or another piece of content so long as that selected content is consistent with the request and the on-going evaluation, including the need for subsequent content within an experimental unit to be non-confounding for the content already assigned to the experimental unit. Non-confounding content, also referred to as unrelated content, is content that is either identical to, or unrelated to the experimental content (i.e., does not have impact on the content objective of the experimental content) previously assigned to the experimental unit.

In some embodiments, where a new experimental unit has been created, content is selected to implement the design of the experiment, based on randomization as well as blocking, balancing and counter-balancing. In some cases, the randomization of the selection of content may be randomized based on the experimental design and the assignment of content to mobile devices, and/or randomizing out the influence of other content delivery channels. In other cases, the randomization of the selection of content may also account for what is being displayed on other displays at the same location, to create different combinations of mobile and within-location display content so that the content evaluation can examine the interaction between specific mobile content treatments and the within-location display treatments.

A mobile content distribution system may further collect data indicative of activities at the location (step 280). These measurements may take various forms intended to capture desired behaviors occurring within the location, such as sales data on point-of-sale systems in stores, or, traffic data for the location or subsections of the location based on sensors. In some embodiments, the measurements do not rely on interaction with the content provided on the mobile device. Data may be collected constantly or collected during defined periods set by the experimental unit. When data is collected continuously, it is associated with the experimental units based on the time at which the data is collected and whether that time is within the boundaries of the experimental unit.

In some embodiments, the duration of an experimental unit is defined by a level of activity in the location (e.g., the experiment unit ends when a predetermined number of activities occur). In such embodiments, it may be necessary to clear out carryover effects from content distributed during the experimental unit, which may still influence behaviors occurring after the end of that experimental unit. In these cases, the system may apply a clear-out period extending after the experimental unit. That clear-out period may be based on the end of the experimental unit or based upon the last request made during the experimental unit. In such cases, the clear-out period should be at least one RRD, to ensure that actions induced by content distributed during the prior experimental unit will have most likely occurred by the end of the clear-out period. The clear-out period may be handled in a variety of ways. In some embodiments, a new experimental unit will start in response to a request for content before the end of a clear-out, but data will not be collected during the remaining portion of the clear-out period following the start of the new experimental unit. In other embodiments, the new experimental unit will begin, but data during the remaining clear-out period will be weighted to represent the possibility that prior content influenced the behavior being observed. In yet other embodiments, the request for mobile content will not initiate a new experimental unit unless it comes after the end of the clear-out period following the previous experimental unit.

In some embodiments, data collected may be associated with the mobile content or the combination of mobile and within-location display content by looking at the time of the data entries and cross-referencing those times with the times at which mobile content was delivered. In embodiments where the duration of an experimental unit is defined by time, the data indicative of activities at the location is collected during the experimental unit where the content was distributed. In embodiments where the duration of an experimental unit is defined by a level of activity, the data indicative of activities at the location is collected from the initiation of the experimental unit where the content is provided in response to requests through the achievement of the desired level of activity, adjusted for the clear-out of carryover effects when necessary (e.g. using weighted data).

In some embodiments, the mobile content distribution system may evaluate content effectiveness using the collected data (step 290). The effectiveness evaluation may apply a machine learning routine, such as a reinforcement learning routine, Newtonian calculus approaches, genetic algorithms, neural networks, or the like, or a combination thereof. In some embodiments, the experimental data is used to algorithmically select content to distribute to mobile devices during explore and exploit routines executed by a machine learning system, directing the distribution of explore or exploit content identified by the machine learning algorithm and the collected data to mobile requests that are not responded to with experimental content.

Figure 2B:
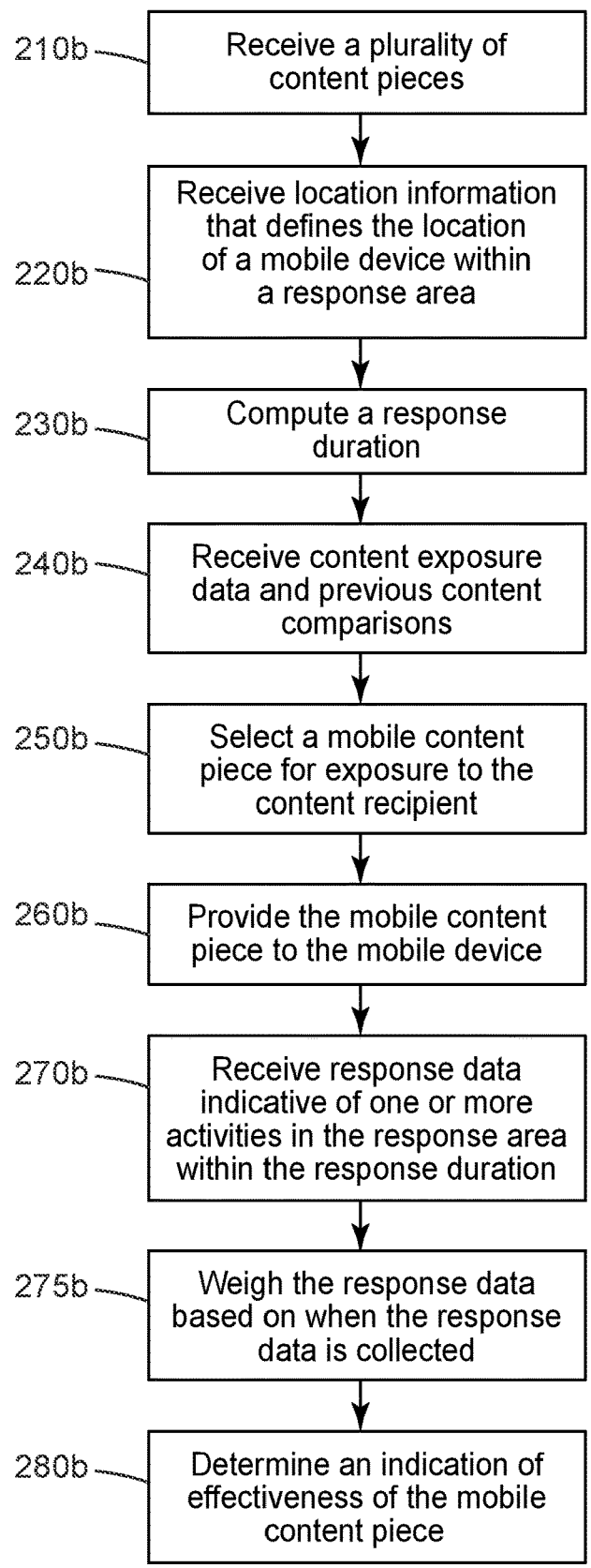

FIG. 2B illustrates a flow diagram for another embodiment of a mobile content distribution system, where one or more steps are optional. First, receiving a plurality of content pieces (step 210*b*), wherein each content piece is associated with at least one content comparison. Next, the system receives location information (step 220*b*), which defines the location of a mobile device within a response area, the mobile device associated with a content recipient. Based on the location information, the system computes a response duration that defines a period of time during which content recipient likely act in response to exposure to a content piece (step 230*b*). The system further receives or retrieves content exposure data that specifies previous content pieces already presented in the response area within the response duration and previous content comparisons that the previous content pieces are associated with (step 240*b*). The system selects a mobile content piece for exposure to the content recipient (step 250*b*) from the plurality of content pieces, and wherein the selected mobile content piece is not associated with any of the previous content comparisons or identical to one of the previous content pieces; and provides the mobile content piece to the mobile device (step 260*b*).

In some embodiments, the system receives response data indicative of one or more activities in the response area within the response duration (step 270*b*) after the selected mobile content piece is provided to the mobile. The system uses the response data to determine an indication of effectiveness of the mobile content piece is in influencing recipient behavior (step 280*b*). Optionally, the system can weigh the response data based on when the response data is collected (step 275*b*); and determine the indication of the effectiveness of the selected mobile content piece in influencing recipient behavior (step 280*b*) based on the weighted data.

The Internet has seemingly established itself as offering the "gold standard" of measurable marketing communication because it provides a "closed loop" in which a marketing message can be distributed, and a consumer's response can be observed and tracked. The response often takes the form of a mouse click or a series of mouse clicks, or a duration of time spent on a web page, or some other metric that is tracked by a plethora of monitoring services such as the monitoring services that use "cookies" set on an individual's computer, that track their online behaviors. Most of these measurements are direct interactions with the content, providing certainty that the content has been seen by the viewer and influenced their action. Sophisticated analytical capabilities have been developed by several prominent Internet media companies and by specialized Internet-focused marketing analytics firms. These capabilities include algorithmic distribution of myriad message versions combined with so called "real-time" tracking of user responses revealing correlations between message versions and performance metrics, such as click-through rates.

Outside of the Internet, the behavior to be measured typically does not involve direct interaction with the content; there is no "click" in the off-line economy, instead there is, for example, viewing content on one display, then picking up an item and purchasing it at a cashier's register without having ever interacted with the display. Because of this, there is a significant credit assignment problem when attempting to attribute behaviors to particular pieces of content; in the absence of direct interactions with the content by a distinct, identifiable unit, the relationship between the independent variable (the content) and the dependent variable (the behavior to be measured) is far more complex and difficult to examine through experimentation.

In mobile systems, someone accessing content may act on it in a variety of ways that do not involve interaction with the content; a content recipient may be in a location where their off-line behavior may be influenced by the content, directing them towards specific behaviors in a location that may not be captured by traditional internet measurement systems.

In some embodiments, content is a web page to which the user is directed, variations of which may embody different experimental conditions. In other embodiments, content is a visual presentation on the mobile device, such as an image, a video, or a particular portion of a web page being served. Content may be rendered files or may be the components required to make a presentation on a display, for example a set of content elements, the spatial relationships among those elements and transitions affecting those elements and relationships, which are then rendered on the mobile device.

The relationship between the content related data and the content objective in the offline world may be influenced by a variety of factors not present in the online world. First, there is no guarantee that an actor in the offline world even saw the content, since the measured behavior is distinct from interaction with the content. In an online system, someone must interact with content to produce the measured behavior, which requires exposure to that content. Second, the offline economy includes numerous possible channels for the communication of content (e.g. in-store signage, billboards, television and radio advertising, print advertising and coupons), creating uncertainty about which piece of content had an effect and creating a greater risk of confounds across those different channels of content presentation. Additionally, in-store sales may be confounded by non-content related variables, such as the weather, traffic, crowds, and other such factors.

It is possible to address the credit assignment problem through different means based on the particular experimental unit used. The internet uses individuals as their experimental unit, and there have been attempts to transfer that to the non-Internet economy. When the experimental unit is specific, known individuals, credit assignment in non-Internet scenarios may be addressed by using a proxy behavior that requires interaction with content and that can be associated with the behavior to be measured. Examples of this include the scanning of QR (Quick Response) codes or Microsoft TAGs, check-ins on social media, couponing campaigns, and loyalty programs. All of these methods share certain limitations: only a portion of the sample will opt-in and undertake these extra efforts, the self-selecting nature of opting-in biases the sample that can be experimented upon, and it usually requires some sort of incentive to induce people to opt-in, adding cost and complexity to these attempts at measurement.

Another approach to the credit assignment problem is to construct the experimental unit differently. It is possible to use specific periods of time as the experimental unit, instead of individuals. This is done by applying content to specific periods of time and measuring the behaviors within that period of time. Parsing time into experimental units and assigning content to these experimental units in a way that limits potential confounds allows for measurement without individual tracking approaches to the off-line world.

Alternative experimental units that are not based on individual content recipients and their behavior eliminate the need to track those individuals. Instead, approaches based on time or activity-level defined experimental units require greater coordination of the network as a whole to ensure consistent distribution of content in a way that implements the experimental design for the entire time being used as the experimental unit in a location. This also requires accounting for the possible confounds particular to treating the period of time as the experimental unit, such as the timing with which content recipients may act.

The ability to quickly and efficiently evaluate content effectiveness is very important. Content effectiveness is a dynamic variable, changing over time. Because of these changes, the speed with which a powerful experiment can be conducted is important to the ability to capitalize on knowledge of content effectiveness. As a result, the prevention of confounds and creation of proper data measurement periods must balance the amount of time dedicated to clearing out potential carryovers and ensuring that actions in response to content are captured must be balanced against the need to have as many experimental units as possible across a network. Recipient response duration (RRD) is the period tailored to capturing proper amounts of clean data without overly limiting the number of potential experimental units, since the RRD represents the period during which a content recipient is likely able to act in response to that content.

The need for efficiency and experimental power is further amplified when content selections are to be made through a machine learning routines, such as a reinforcement learning routine, Newtonian calculus approaches, genetic algorithms, neural networks, and combinations of those methods. Experimental data may be incorporated into machine learning as a starting point for the algorithms. For example, factorial ANOVA, using time variables such as particular day parts and location variables may be used to create a model producing a starting point for machine learning. These routines are capable of optimizing even when differences are small, so long as those differences are known with a high degree of certainty made possible by powerful experiments, even though the dynamic nature of content effectiveness reduces certainty over time. These routines may also use knowledge of the interactions between mobile and within-location content when selecting content for within-location display, valuing the overall effect of the combination instead of just the specific effect of the within-location or mobile content.

Randomization is used to control for the numerous potential confounding variables present in measuring responses to mobile content in a given location. Randomization of content accounts for variables by ensuring that additional variables do not confound the content evaluation results by systematically varying with the different content presented. Randomization may be constrained in circumstances where additional variables are to be examined for their effects on the content, for example customer socio-economic status, location population density, shopper gender breakdown, current location product mix, or time variables such as part of day, day of week, or part of year. Randomization may be done at the level of whole, complete pieces of content, or the randomization may be done through the selection of different content elements and spatial relationships among the content elements and transitions affecting such elements, which are used to define and automatically generate content.

In some embodiments, the content presented on displays within a location is included in the randomization process, which operates to randomize the distribution of treatments where the treatments are defined as combinations of the within-location display content and the mobile content being distributed. In these cases, the within-location display content is treated as fixed and the selection of mobile is based on the potential combinations that can be created and ensuring the distribution of combinations is properly randomized.

Two types of blocking may be employed for different reasons; blocking by optimization factors and blocking by noise variables. Optimization factors are those factors at the display location that might have implications for the effectiveness of the content. Such factors include signage location, ambient lighting, socioeconomic status of viewers, dayparts, and the like. Blocking by these factors allows for factorial analyses to measure interactions between content and optimization factors (e.g., measuring whether content A is more effective in the morning whereas content B is more effective in the evening). Blocking by noise variables can be used to increase statistical power by eliminating variability associated with factors that impact the dependent variable that are predictable but that are of no interest with respect to the evaluation.

The content evaluation process may use balancing and counterbalancing when determining the content to assign to an experimental unit. Balancing ensures that each of the content treatments (i.e., a piece of content or a combination of content pieces) and corresponding interaction are independent of each other. Counterbalancing controls for order effects in a repeated measures design by either including all orders of content treatments or randomly determining the order of treatments for each experimental unit.

Assigning content to mobile devices also needs to prevent the occurrence of within-location confounds. If two different mobile users in the same location receive different but related experimental content during the same time period, it becomes impossible to accurately attribute the results from that time period to a piece of content. Therefore, when selecting a piece of content to serve during an on-going experimental unit, the selected content must not be content that is non-identical but related to the experimental content already assigned to a mobile request during this experimental unit and in some embodiments, a following clear-out period.

Figure 3:
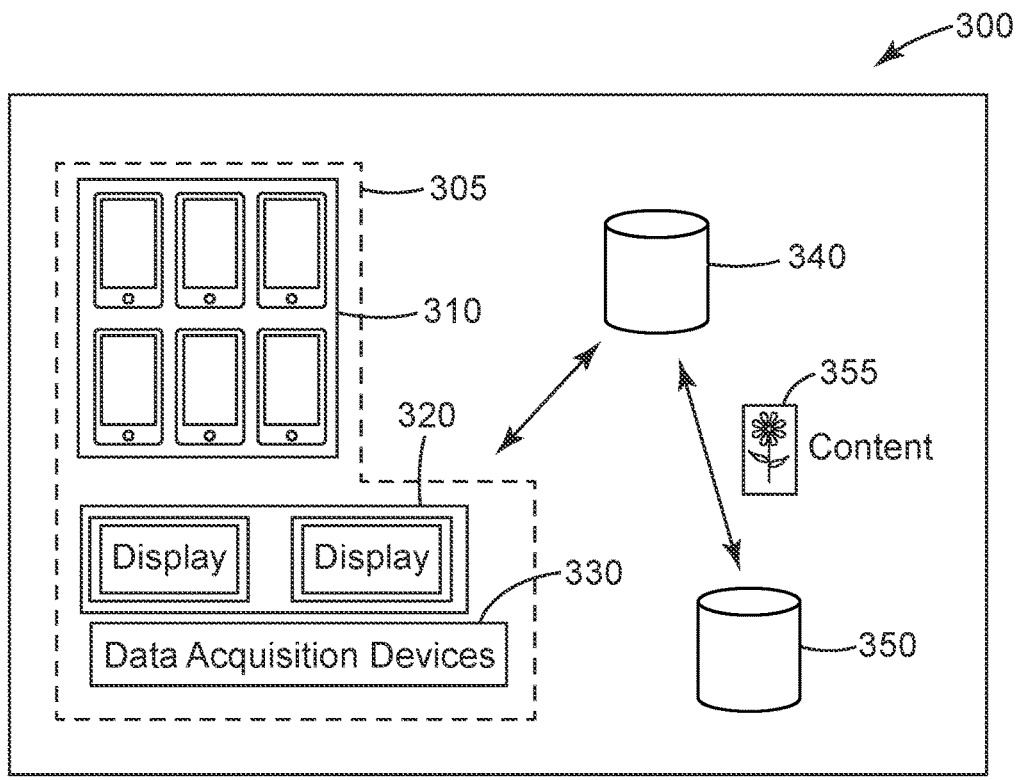
FIG. 3 illustrates a system diagram including possible components for a mobile content distribution system.

FIG. 3 illustrates a system diagram including possible components for a mobile content distribution system 300. In the embodiment as illustrated, the system 300 includes mobile devices 310, within-location displays 320, and data acquisition devices 330, where these components can be hosted at a location 305. The system 300 may include a content management server 340 that manage and distribute pieces of content, and receive data collected by the data acquisition devices. The content management server 340 can include one or more computing devices, where the computing device(s) can locate at the location and/or remotely from the location. The system 300 may also include a data repository 350 to store and provide content 355 to the content management server 340. The data repository 350 can also store data collected by the data acquisition devices 330. The data repository 350 can include one or more transitory and non-transitory computer readable storage medium that are located at the location and/or remotely from the location. The content management server 340 may evaluate the effectiveness of content based on collected data and store the evaluation at the data repository 350 and/or provide visual indicia indicating the content effectiveness. The content management server 340 may execute computer program to implement one or more functional units illustrated in FIG. 1, for example, the content managing unit 130, the content serving unit 135, the data analysis unit 150, and etc.

Figure 4:
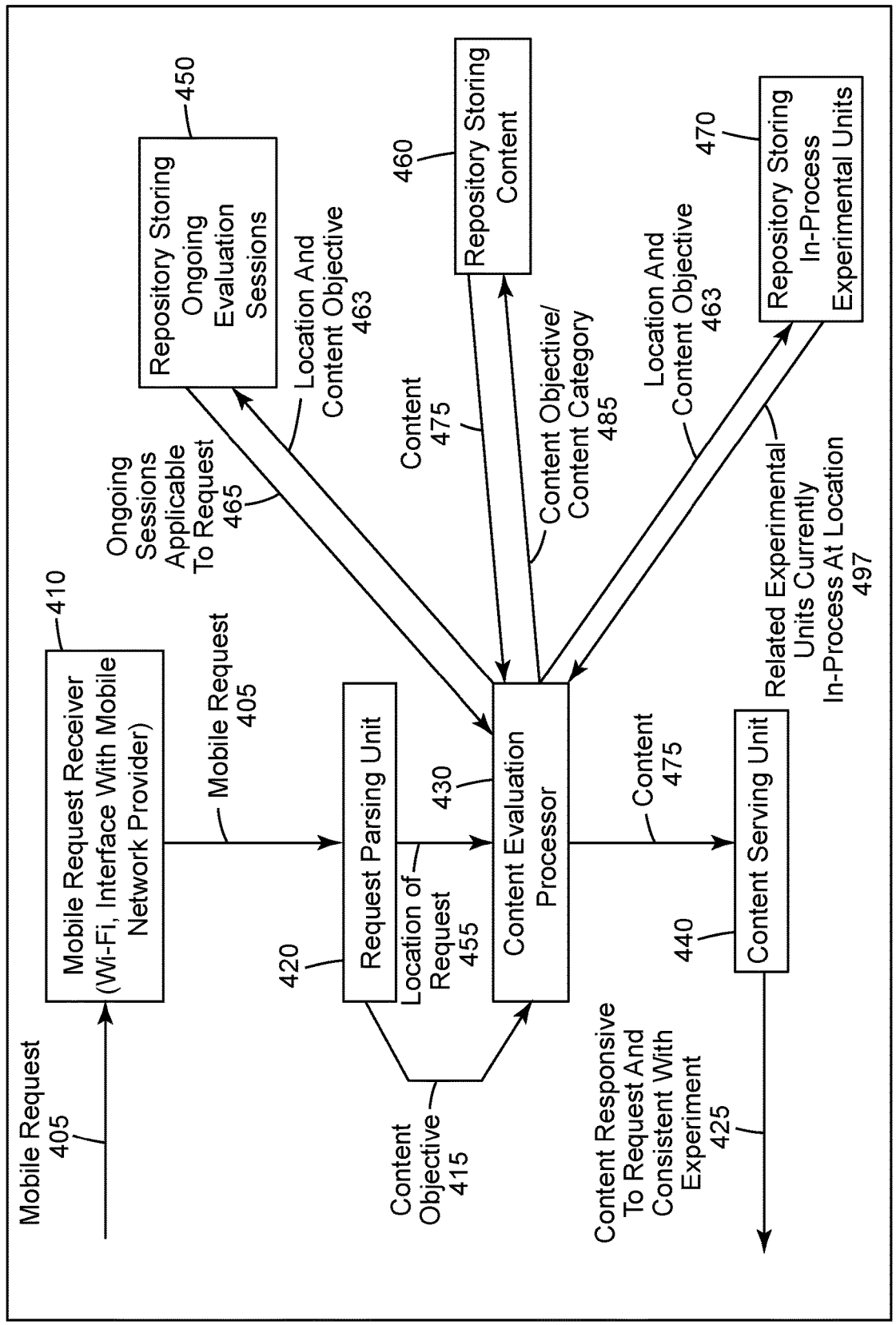
FIG. 4 is a data flow diagram for an embodiment of a mobile content distribution system illustrating possible data transformation and usage.

FIG. 4 is a data flow diagram for an embodiment of a mobile content distribution system illustrating possible data transformation and usage. The mobile request 405 sent by a mobile device is received by the mobile request receiver 410. The mobile request receiver 410 may receive the request via internet or an interface with mobile network provider, for example. The request parsing unit 420 extracts the relevant location data 445 and the content objective 415 based on the request. The relevant location data may be, for example the location of a Wi-Fi network, near-field communications such as Bluetooth, GPS data, and/or cell tower information. The content objective is determined from information accompanying or related to the request, for example search terms used or tags associated with the page being requested.

The content evaluation processor 430 receives the content objective 415 and location data 455 and communicates with data repository storing ongoing content evaluation sessions 450 and data repository storing in-process experimental units 470, transmitting the location and content objective 463 to those repositories. The content evaluation processor 430 receives data from those repositories relating to ongoing evaluations sessions applicable to the request 465 and related experimental units currently in-process at the location 497. The content evaluation processor 430 then transmit the content objective and/or content category 485 that is derived from the mobile request to the data repository storing content 460 and receives content 475 responsive to the request from the data repository storing content 460. Content 475 may include a set of suitable content pieces, and the content evaluation processor 430 may further select one piece of content from the set of suitable content pieces using experimental design techniques, for example, randomization, blocking, balancing, counterbalancing, or the like. The selected piece of content 475 is then provided to a content serving unit 435 that supplies the content responsive to request 425 to the mobile device.

Figure 5A:
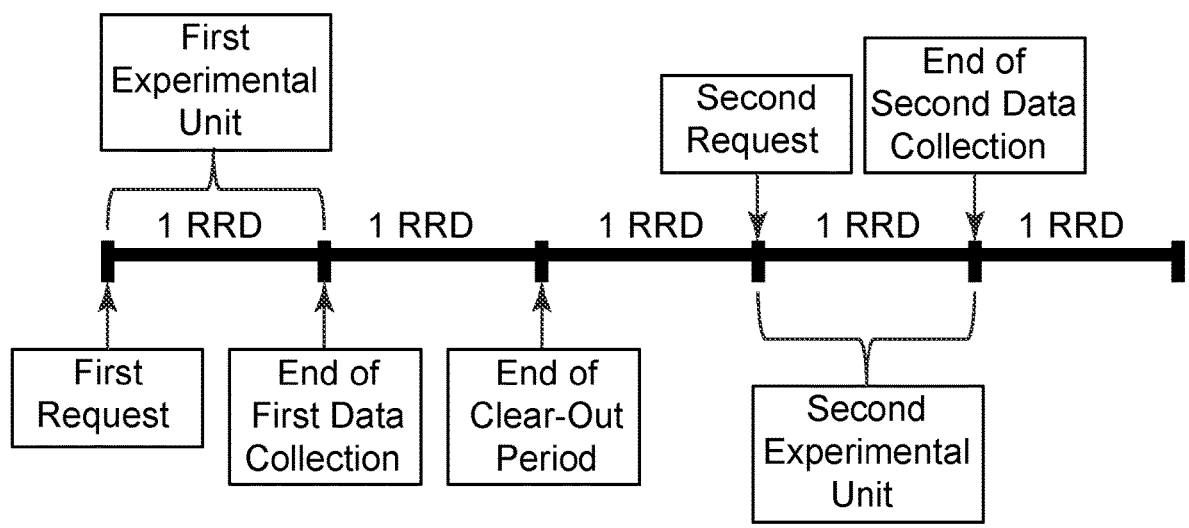
FIGS. 5A, 5B, and 5C are exemplary timelines of receiving mobile requests and assignments of mobile content to experimental units.
Figure 5B:
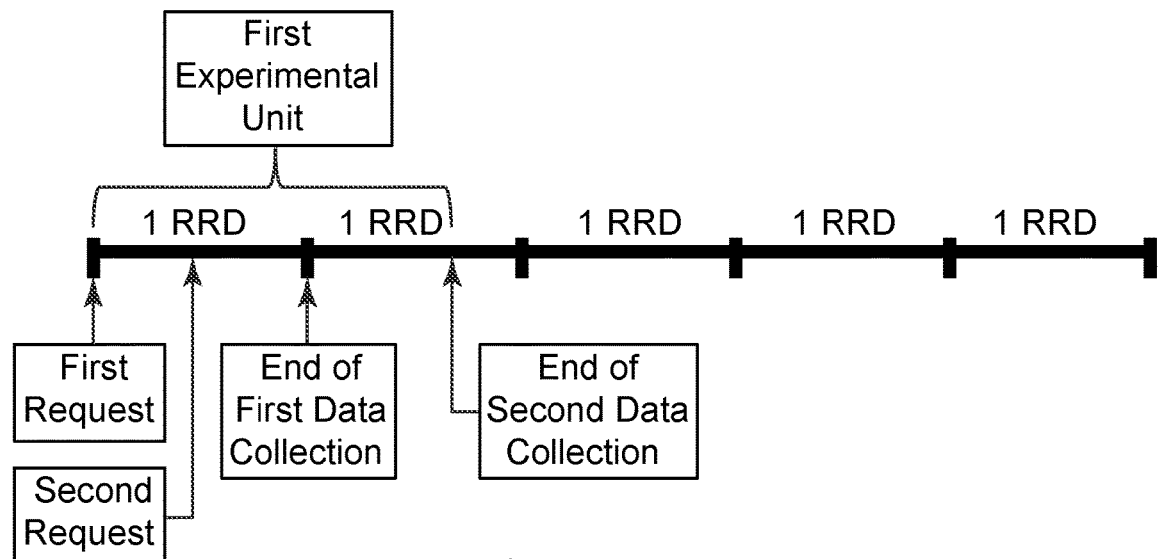
Figure 5C:
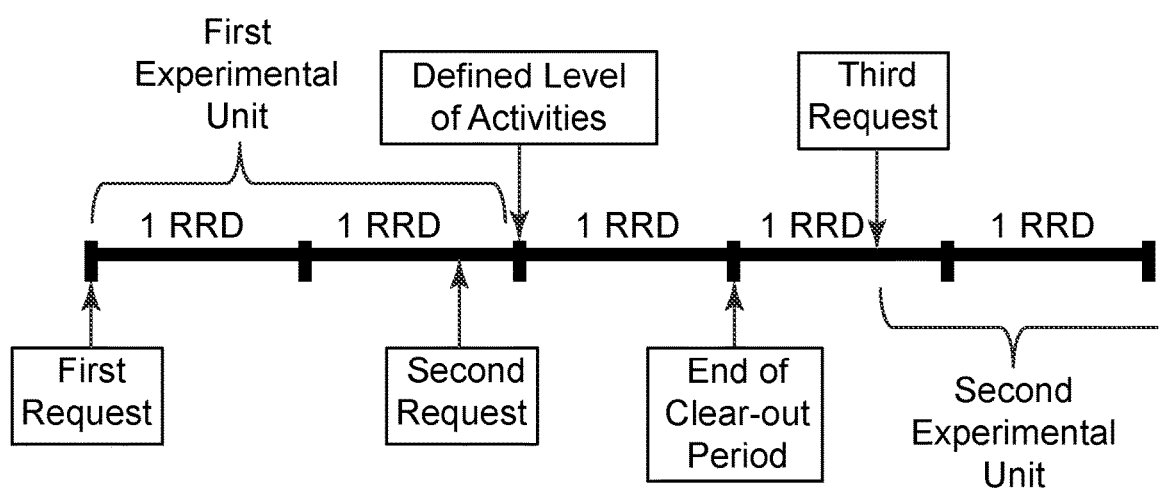

FIGS. 5A, 5B, and 5C are exemplary timelines of mobile requests, assignment of mobile content to experimental units. The embodiments illustrated in FIGS. 5A and 5B use experimental units with predetermined duration. The embodiment illustrated in FIG. 5C uses experimental unit that will end when a predetermined level of activity occurs. In FIG. 5A, a first mobile request is received and this triggers the creation of a first experimental unit to which content is assigned. The first data collection period begins when the mobile request is received and continues for the duration of the experimental unit, which in this case is one recipient response duration (RRD). When a second content request is received following the end of the first data collection period, a second experimental unit is created, and second data collection period continues until one RRD after the content request has been made.

In FIG. 5B, a first mobile request is received and a first experimental unit is created. Before the end of the first data collection, a second request related to the same experiment is received. In some embodiments, the system may assign the second request to the first experimental unit. In these circumstances, the second request for content is given the same treatment as the first mobile request, and the second data collection period continues until one RRD after the second request has been received, extending the first experimental unit.

In FIG. 5C, the timeline represents the activity of an embodiment of the disclosure where the experimental unit ends when a level of activity is reached (e.g., a predetermined number of transactions). The first mobile request is received and a first experimental unit is created. That first experimental unit continues until the conditions are met; in this embodiment, the dependent variable is the amount of time taken to observe a defined level of behavior in the location. Additional requests during the first experimental unit, such as the second request, are given the same treatment as the first request. The experimental unit concludes when the level of activity is met; this ends the experimental unit even if less than one RRD has passed since the last request for content. Because some recipients of mobile content could still act following the end of the experimental unit, a clear-out period is required before data collection can begin for a new experimental unit. As illustrated in FIG. 5C, the next request for content triggering the creation of another experimental unit if the request comes after the end of the clear-out period, such as receiving the third request starts the second experimental unit. In cases where the content request comes before the end of the previous clear-out period, the system may eliminate or use weighted data from the clear-out period, or wait until the clear-out period has ended before creating a new experimental unit.

EXEMPLARY EMBODIMENTS

Embodiment 1. A method of determining how effective content is in influencing recipient behavior with a computer system having one or more processors and memories, comprising:
  receiving a request for content from a mobile device at a location;
  receiving a response duration during which content recipient likely act in response to the content at the location;
  retrieving location information, by one of the one or more processors, from the request the content;
  identifying, by one of the one or more processors, an experimental unit that is on-going based on the location information;
  selecting, by one of the one or more processors, a mobile content piece satisfying the request, the mobile content piece being unrelated to one or more pieces of content used in the experimental unit; and
  providing the mobile content piece to the mobile device.

Embodiment 2. The method of Embodiment 1, further comprising:
  collecting data indicative of one or more specified activities at the location after the mobile content piece is provided to the mobile device during the experimental unit.

Embodiment 3. The method of Embodiment 2, further comprising:
  using the collected data to determine, by one of the one or more processors, an indication of effectiveness of the mobile content piece is in influencing recipient behavior.

Embodiment 4. The method of Embodiment 3, further comprising:
  weighting the collected data based on when the collected data is collected during the experimental unit; and
  determining the indication of the effectiveness of the mobile content piece in influencing recipient behavior based on the weighted data.

Embodiment 5. The method of any one of Embodiment 1 to Embodiment 4, further comprising:
  identifying, by one of the one or more processors, within-location content presenting on one or more displays at the location,
  wherein the selecting step comprises selecting the mobile content piece to form a specific combination with the within-location content.

Embodiment 6. The method of any one of Embodiment 1 to Embodiment 5, wherein the duration of the experiment unit is selected based on the response duration.

Embodiment 7. The method of any one of Embodiment 1 to Embodiment 6, wherein the duration of the experiment unit is greater than the response duration.

Embodiment 8. The method of any one of Embodiment 1 to Embodiment 7, wherein the experimental unit ends when a predetermined level of the one or more specified transactions is reached.

Embodiment 9. The method of any one of Embodiment 1 to Embodiment 8, further comprising:
selecting, by one of the one or more processors, within-location content to be presented on displays at the location, wherein the selected mobile content is unconfounded with the within-location content.

Embodiment 10. The method of any one of Embodiment 1 to Embodiment 9, further comprising:
selecting, by one of the one or more processors, within-location content to be presented on displays at the location, wherein the selected mobile content and the within-location content is a specific combination.

Embodiment 11. A computer system for determining how effective content is in influencing recipient behavior, comprising:
a mobile request receiver configured to receive content request from a mobile device at a location;
a location parsing unit configured to parse location information from the mobile request;
a content managing unit configured to select an experimental unit that is on-going based on the location information, the content managing unit further configured to select a mobile content piece satisfying the mobile request, the mobile content piece being unrelated to one or more pieces of content used in the experiment unit; and
a content serving unit configured to provide the mobile content piece to the mobile device.

Embodiment 12. The system of Embodiment 11, further comprising:
a data acquisition unit configured to collect data indicative of one or more specified activities at the location after the mobile content piece is provided to the mobile device during the experimental unit.

Embodiment 13. The system of Embodiment 12, further comprising:
a data analysis unit configured to determine an indication of effectiveness of the mobile content piece is in influencing recipient behavior using the collected data.

Embodiment 14. The system of Embodiment 13, wherein the data analysis unit is further configured to weight the collected data based on when the collected data is collected during the experimental unit and determine the indication of the effectiveness of the mobile content piece in influencing recipient behavior based on the weighted data.

Embodiment 15. The system of any one of Embodiment 11 to Embodiment 14, wherein the content managing unit is further configured to identifying within-location content presenting on one or more displays at the location, and
wherein the content managing unit is further configured to select the mobile content piece to form a specific combination with the within-location content.

Embodiment 16. The system of any one of Embodiment 11 to Embodiment 15, wherein the duration of the experimental unit is selected based on a response duration during which content recipient likely act in response to the content at the location.

Embodiment 17. The system of any one of Embodiment 11 to Embodiment 16, wherein the duration of the experimental unit is greater than a response duration during which content recipient likely act in response to the content at the location.

Embodiment 18. The system of any one of Embodiment 11 to Embodiment 17, wherein the experimental unit ends when a predetermined level of the one or more specified transactions is reached.

Embodiment 19. The system of any one of Embodiment 11 to Embodiment 18, wherein the content managing unit is further configured to select within-location content to be presented on displays at the location, wherein the selected mobile content is unconfounded with the within-location content.

Embodiment 20. The system of any one of Embodiment 11 to Embodiment 19, wherein the content managing unit is further configured to select within-location content to be presented on displays at the location, wherein the selected mobile content and the within-location content is a specific combination.

The present disclosure should not be considered limited to the particular examples and embodiments described above, as such embodiments are described in detail to facilitate explanation of various aspects of the disclosure. Rather the present disclosure should be understood to cover all aspects of the disclosure, including various modifications, equivalent processes, and alternative devices falling within the spirit and scope of the disclosure as defined by the appended claims and their equivalents.

What is claimed is:

1. A computer-implemented method comprising:
receiving, by a content delivery system, from at least one device, at least one content comparison that indicates an effectiveness of at least one content piece of a subset of a plurality of content pieces associated with an experimental unit;
receiving, by the content delivery system, location information that defines a location of the at least one device within a response area and during the experimental unit, the at least one device being associated with a content recipient;
based on the location information, determining, by the content delivery system, a response duration that defines an expected period of time for receipt of a response to a respective content piece of delivered content pieces, the respective content piece being delivered to the at least one device within the response area and during the experimental unit;
selecting, by the content delivery system, a content piece for delivery to the at least one device within the response area;
sending, by the content delivery system, the selected content piece to the at least one device during the experimental unit;
receiving response data indicative of one or more activities that occurred in the response area within the experimental unit and after the selected content piece is sent to the at least one device;
using, by the content delivery system, the response data to determine an effectiveness of the content piece with respect to the response area during the experimental unit;
based on the response data and a time at which the response data is collected, forming, by the content delivery system, weighted response data; and
determining, by the content delivery system, the effectiveness of the selected content piece further based on the weighted response data.

2. The method of claim 1, wherein at least one device of the at least one device is a mobile device.

3. The method of claim 1, further comprising obtaining content exposure data that specifies previous content pieces already presented in the response area within the experimental unit and previous content comparisons that indicate respective effectiveness data for the previous content pieces during the experimental unit.

4. The method of claim 1, further comprising identifying, by one of the content delivery system, within-location content presented via one or more displays located within the response area and during the experimental unit, wherein selecting the content piece comprises selecting, by the content delivery system, the content piece to form a predetermined combination with the within-location content.

5. The method of claim 1, further comprising selecting, by the content delivery system, within-location content to be presented via one or more displays located within the response area and during the experimental unit, wherein the selected content piece was not evaluated in any content comparison in which within-location content was evaluated.

6. The method of claim 1, further comprising selecting, by the content delivery system, within-location content to be presented via one or more displays located within the response area and during the experimental unit, wherein the selected content piece and within-location content form a combination predetermined by the content delivery system.

7. The method of claim 1, further comprising defining, by the content delivery system, an experimental unit associated with a subset of the plurality of content pieces distributed to the at least one device, wherein defining the experimental unit comprises defining the experimental unit as a predetermined duration of time.

8. The method of claim 1, further comprising defining, by the content delivery system, an experimental unit associated with a subset of the plurality of content pieces distributed to the at least one device, wherein defining the experimental unit comprises defining the experimental unit as a duration of time taken for a predetermined level of activity to occur within the response area.

9. A content delivery system for content effectiveness-based content delivery, the content delivery system comprising:
  a communication interface;
  a memory configured to store a plurality of content pieces;
  one or more processors in communication with the memory, the one or more processors being configured to:
    receive, via the communication interface, from at least one device, at least one content comparison that indicates an effectiveness of at least one content piece of a subset of a plurality of content pieces associated with an experimental unit; and
    receive, via the communication interface, location information that defines a location of the at least one device within a response area and during the experimental unit, the at least one device being associated with a content recipient; and
  a content managing unit executing on the one or more processors and configured to
    select a content piece from the plurality of content pieces;
    determine, based on the location information, a response duration that defines an expected period of time for receipt of a response a respective content piece of delivered content pieces, the respective content piece being delivered to the at least one device within the response area and during the experimental unit;
    select a content piece for delivery to the at least one device within the response area;
    send, via the communication interface, the selected content piece to the at least one device during the experimental unit;
    collect, via the communication interface, response data indicative of activities that occurred in the response area within the experimental unit and after the selected content piece is sent to the at least one device;
    use the response data to determine an effectiveness of the content piece with respect to the response area during the experimental unit;
    form, based on the response data and a time at which the response data is collected, weighted response data; and
    determine the effectiveness of the selected content piece further based on the weighted response data.

10. The content delivery system of claim 9, wherein the one or more processors are further configured to identify within-location content presented via one or more displays located within the response area and during the experimental unit, and
  wherein to select the content piece, the one or more processors are configured to form a predetermined combination with the within-location content.

11. The content delivery system of claim 9, wherein the one or more processors are further configured to select within-location content to be presented via one or more displays located within the response area and during the experimental unit, wherein the selected mobile content piece was not evaluated in any content comparison in which the within-location content was evaluated.

12. The content delivery system of claim 9, wherein the one or more processors are further configured to select within-location content to be presented via one or more displays located within the response area and during the experimental unit, wherein the selected mobile content piece and within-location content form a combination predetermined by the one or more processors.

13. The content delivery system of claim 9, wherein the one or more processors are further configured to define an experimental unit associated with a subset of the plurality of content pieces distributed to the at least one device, wherein to define the experimental unit, the one or more processors are configured to define the experimental unit as a predetermined duration of time.

14. The content delivery system of claim 9, wherein the one or more processors are further configured to define an experimental unit associated with a subset of the plurality of content pieces distributed to the at least one device, wherein to define the experimental unit, the one or more processors are configured to define the experimental unit as a duration of time taken for a predetermined level of activity to occur within the response area.

15. The content delivery system of claim 9, wherein at least one device of the at least one device is a mobile device.

16. A computer-implemented method comprising:
  receiving, by a content delivery system, from at least one device, at least one content comparison that indicates an effectiveness of at least one content piece of a subset of a plurality of content pieces associated with an experimental unit;
  receiving, by the content delivery system, location information that defines a location of the at least one device within a response area and during the experimental unit, the at least one device being associated with a content recipient;
  based on the location information, determining, by the content delivery system, a response duration that defines an expected period of time for receipt of a response to a respective content piece of delivered content pieces, the respective content piece being delivered to the at least one device within the response area and during the experimental unit;

selecting, by the content delivery system a content piece for delivery to the at least one device within the response area;

sending, by the content delivery system, the selected content piece to the at least one device during the experimental unit; and identifying, by one of the content delivery system, within-location content presented via one or more displays located within the response area and during the experimental unit.

17. The method of claim 16, further comprising defining, by the content delivery system, an experimental unit associated with a subset of the plurality of content pieces distributed to the one or more mobile devices, wherein defining the experimental unit comprises defining the experimental unit as a duration of time taken for a predetermined level of activity to occur within the response area.

18. The method of claim 16, further comprising selecting, by the content delivery system, within-location content to be presented via one or more displays located within the response area and during the experimental unit, wherein the selected mobile content piece was not evaluated in any content comparison in which the within-location content was evaluated.

19. The method of claim 16, further comprising selecting, by the content delivery system, within-location content to be presented via one or more displays located within the response area and during the experimental unit, wherein the selected mobile content piece and within-location content form a combination predetermined by the content delivery system.

20. The method of claim 16, further comprising receiving response data indicative of one or more activities that occurred in the response area within the experimental unit and after the selected mobile content piece is sent to the at least one device.

* * * * *